(12) United States Patent
Suhre et al.

(10) Patent No.: US 6,561,016 B1
(45) Date of Patent: May 13, 2003

(54) METHOD AND APPARATUS FOR DETERMINING THE AIR CHARGE MASS FOR AN INTERNAL COMBUSTION ENGINE

(75) Inventors: Blake R. Suhre, Neenah, WI (US); Jeffery C. Ehlers, Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/882,700

(22) Filed: Jun. 15, 2001

(51) Int. Cl.$^7$ .............................. G01M 19/00; G01P 5/00
(52) U.S. Cl. ........................................................ 73/118.2
(58) Field of Search .......................... 73/118.2; 123/486, 123/406.49

(56) References Cited

U.S. PATENT DOCUMENTS

| | | | |
|---|---|---|---|
| 4,999,781 A | 3/1991 | Holl et al. .................. 364/431 |
| 5,282,449 A | 2/1994 | Takahashi et al. ........... 123/350 |
| 5,331,936 A | 7/1994 | Messih et al. ............... 123/480 |
| 5,497,329 A | 3/1996 | Tang .......................... 364/431 |
| 5,771,866 A | 6/1998 | Staerzl ........................ 123/531 |
| 5,848,582 A | * 12/1998 | Ehlers et al. ................ 123/486 |
| 5,889,204 A | 3/1999 | Scherer et al. ................. 73/118 |
| 5,988,139 A | 11/1999 | Wasilewski et al. ......... 123/339 |
| 6,098,602 A | 8/2000 | Martin et al. ................ 123/568 |
| 6,115,664 A | 9/2000 | Cullen et al. ................ 701/102 |
| 6,125,830 A | 10/2000 | Kotwicki et al. ............ 123/568 |
| 6,298,824 B1 | * 10/2001 | Suhre .................... 123/406.49 |

* cited by examiner

Primary Examiner—Eric S. McCall
Assistant Examiner—Takisha S Miller
(74) Attorney, Agent, or Firm—William D. Lanyi

(57) ABSTRACT

A method and apparatus are provided for calculating the air charge mass for an engine as a function of four measured parameters. These parameters include the engine speed measured by a tachometer, a throttle position measured by a throttle position sensor, manifold air temperature, and barometric pressure. Without the need for a mass air flow sensor or a manifold absolute pressure sensor, the present invention provides a system for quickly and accurately calculating the air charge mass for the engine.

10 Claims, 3 Drawing Sheets

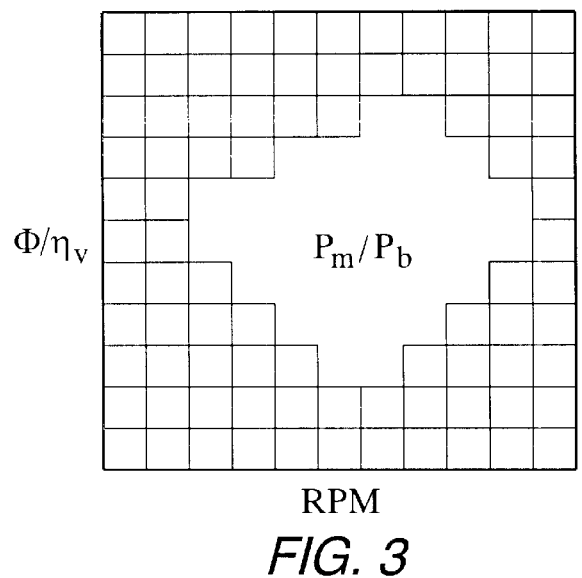
FIG. 3
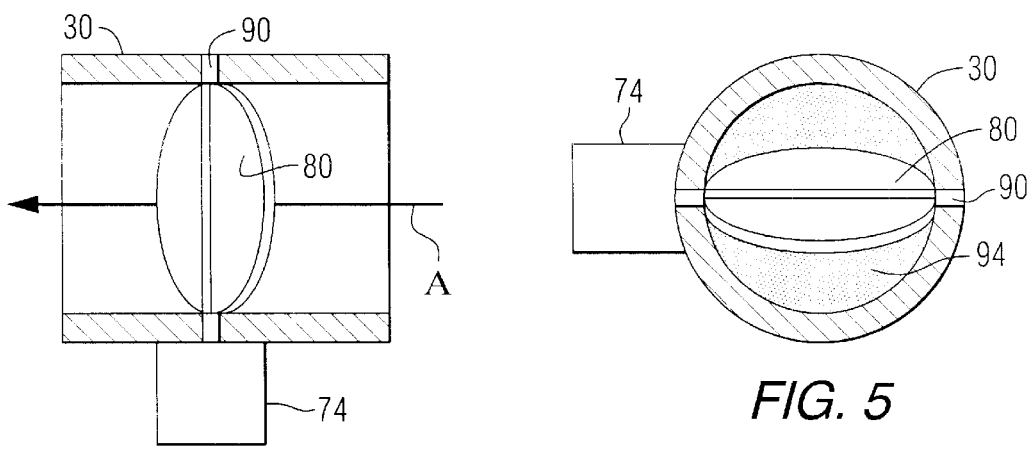
FIG. 4
FIG. 5
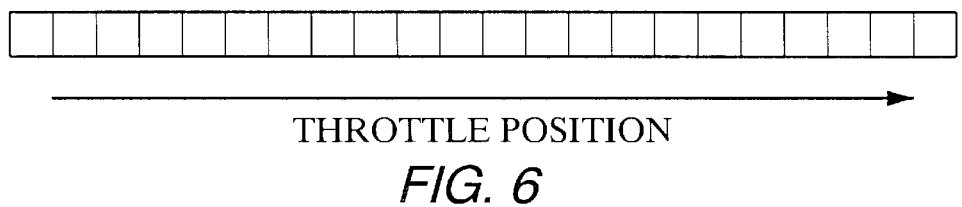
FIG. 6

METHOD AND APPARATUS FOR DETERMINING THE AIR CHARGE MASS FOR AN INTERNAL COMBUSTION ENGINE

BACKGROUND OF THE INVENTION

1. Field of the Invention

The present invention is generally related to a control system for an internal combustion engine and, more specifically, to a control system that is capable of determining the air charge mass for the internal combustion engine based on input from sensors that provide barometric pressure, manifold temperature, throttle position, and engine speed.

2. Description of the Prior Art

Many different types of internal combustion engines are well known to those skilled in the art. In those internal combustion engines which provide an engine control unit (ECU) which monitors various parameters and controls the operation of the engine, it is often necessary to determine the air charge mass in the combustion chambers of the engine during each ignition event. This information is often used by the engine control unit (ECU) to determine an appropriate throttle position and/or fuel injection amount to achieve a desired engine output.

U.S. Pat. No. 5,282,449, which issued to Takahashi et al on Feb. 1, 1994, describes a method and system for engine control. To ensure a high precision simultaneous control of the engine generated torque, air fuel ratio of the automobile engine and related factor, the present invention calculates the target air mass flow rate as the air mass flow rate at the inlet port which achieves the target torque, estimates the air flow condition inside the intake manifold, supplies the result to the fuel injection control system and the throttle control system and determines the fuel injection pulse width which achieves the target air fuel ratio according to the estimated air mass flow rate at the inlet port for the fuel injection control system, while determining the throttle angle which achieves the target torque according to the estimated condition and the target air mass flow rate for the throttle control system.

U.S. Pat. No. 5,331,936, which issued to Messih et al on Jul. 26, 1994, describes a method and apparatus for inferring the actual air charge in an internal combustion engine during transient conditions. A mass air flow based control system for an internal combustion engine is provided which is capable of inferring cylinder air charge during non-steady state periods of operation of the engine. The control system infers cylinder air charge from values of rotational engine speed, air mass flow inducted into the engine, inlet air temperature, engine coolant temperature, and barometric pressure. The control system employs the inferred cylinder air charge value for air/fuel ratio control.

U.S. Pat. No. 5,497,329, which issued to Tang on Mar. 5, 1996, describes a prediction method for engine mass air flow per cylinder. A delta model is used to calculate a predicted manifold absolute pressure (MAP) for a future period and the air mass induced in each cylinder is calculated from such a predicted value and used to determine the correct amount of fuel to inject at that period. Several reference pulses generated for each crankshaft revolution establish one or more sets of equally-spaced points at which measurements are made of the parameters MAP, throttle position, exhaust gas recirculation value, and idle air control. A base value of MAP is calculated, trends of changes in the parameters are calculated for each set of points, and weighted values of the trends are summed with the base value to predict a value of MAP. Alternatively, mass air flow (MAF) is measured as well as the other parameters and mass air per cylinder (MAC) is calculated. Then a base value of MAC is calculated, trends of changes in the parameters are calculated for each set of points, and weighted values of the trends are summed with the base value to predict a value of mass air induced into a cylinder.

U.S. Pat. No. 5,889,204, which issued to Scherer et al on Mar. 30, 1999, describes a device for determining the engine load for an internal combustion engine. The invention provides a device for determining the engine load for an internal combustion engine, such device having an input channel for receiving an item of engine speed information, as well as an intake manifold pressure sensor, and an air mass flow rate sensor arranged upstream of a throttle valve, and/or a throttle valve angle sensor. The engine speed is fed to a Kalman filter as an input value and at least one of the three variables, including intake manifold pressure, throttle valve air mass flow rate, and throttle valve angle, is fed as a variable measured by the respective sensor. The Kalman filter derives estimated values for the variables intake manifold pressure and throttle valve air mass flow rate, with which the air mass flowing into a respective cylinder of the engine per working cycle is determined.

U.S. Pat. No. 6,098,602, which issued to Martin et al on Aug. 8, 2000, describes an exhaust gas recirculation system. The EGR system for an internal combustion engine comprises a stepper motor driven EGR valve to control the rate of exhaust gas recirculation in the engine and an electronic controller for determining a desired EGR percent mass flow rate as a function comprising a rotational speed value and an air charge value of the engine, converting the EGR percent mass flow rate to an EGR mass flow rate value, adjusting the EGR mass flow rate value as a function of an exhaust gas temperature value and an absolute exhaust gas back pressure value using MAP values, determining a pressure ratio value across an EGR orifice cooperating with the EGR valve, and determining a required number of motor steps as a function of the adjusted EGR mass flow rate value and the pressure ratio value to achieve the desired EGR percent mass flow rate.

U.S. Pat. No. 6,115,664, which issued to Cullen et al on Sep. 5, 2000, describes a method of estimating engine charge. The method of estimating the total charge to cylinders of an internal combustion engine where the total charge comprises the sum of the air charge and the EGR charge is provided. The total charge is estimated by determining a linear total charge versus MAP reference function at selected engine speeds and at a preselected reference barometric pressure, reference engine coolant temperature, and reference manifold air charge temperature and determining a current barometric pressure value, a current engine coolant temperature value, and a current intake manifold air charge temperature. An intercept of the total charge versus MAP reference function with a total charge axis is adjusted for current barometric pressure different from the reference barometric pressure, and the slope of the total air charge versus MAP reference function is adjusted for current engine coolant temperature and current manifold air charge temperature different from the reference engine coolant temperature value and the reference manifold air charge temperature value. An adjusted total charge is determined by engine control logic based on the adjusted intercept and the adjusted slope of the engine. An estimated EGR charge can be subtracted from the adjusted total charge to estimate air mass flow rate entering the engine cylinders.

U.S. Pat. No. 6,125,830, which issued to Kotwicki et al on Oct. 3, 2000, describes a flow measurement and control system with estimated manifold pressure. An exhaust gas recirculation system directs exhaust gasses from an exhaust manifold to an intake manifold of an internal combustion engine. The exhaust gasses travel from the exhaust manifold, first passing through a flow control valve and then through a measuring orifice before entering the intake manifold. Pressure difference across the orifice is used, along with estimated manifold pressure from a mass air flow sensor, to measure and control exhaust gas flow.

U.S. Pat. No. 4,999,781, which issued to Holl et al on Mar. 12, 1991, describes a closed loop mass airflow determination via throttle position. Mass air flow into an internal combustion engine is measured as a function of throttle opening. The mass air flow rate is expressed as an idle offset constant and the product of gain and effective air intake area which is a function of throttle position. During idle, the idle offset term is updated in response to an exhaust oxygen sensor feedback and during part throttle operation the gain is similarly updated to achieve stoichiometry. For subsonic air flow the mass air flow is further modified as a function of the ratio of manifold pressure to the pressure upstream of the throttle. At the same time the manifold dilution is controlled via an EGR valve to a predetermined schedule.

U.S. Pat. No. 5,771,866, which issued to Staerzl on Jun. 30, 1998, discloses a nozzle for a low pressure fuel injection system. A nozzle is provided for a fuel injection system in which a cap is disposed around a common termination of a first and second conduit. The first and second conduits are associated in coaxial and concentric relation with each other. A liquid fuel is transmitted through the first conduit and air is transmitted through the second conduit. The air is taken into the second conduit at atmospheric pressure without the need for an air compressor. An opening is formed at the cap of the nozzle to allow the fine mist formed at the common termination of the first and second conduits to flow out of the nozzle and into the air stream, such as within an intake manifold, for transport in the air stream to the combustion chamber of a cylinder within the internal combustion engine.

U.S. Pat. No. 5,988,139, which issued to Wasilewski et al on Nov. 23, 1999, discloses a method and apparatus for controlling an internal combustion engine. An engine control system digitally stores corresponding values of timing angles and engine speeds and selects the timing angles based on the operating speed of the engine. At the engine speed range near idle speed, the timing angle is set to a preselected angle after top dead center (ATDC) and the relationship between engine speed and timing angle calls for the timing angle to be advanced from the preselected angle after top dead center (ATDC) to successively advancing angles which subsequently increase angles before top dead center (BTDC) as the engine increases in speed. In one application, a timing angle of 10 degrees after to dead center (ATDC) is selected for an engine idle speed of approximately 800 RPM. This relationship, which is controlled by the engine control unit, avoids stalling the engine when an operator suddenly decreases the engine speed.

The patents described above are hereby expressly incorporated by reference in the description of the present invention.

As can be seen in the above described patents, many different control systems require knowledge of the air charge mass within the combustion chamber of the cylinders of the engine. The magnitude of the charged air mass can be determined in several ways. One way that is known to those skilled in the art is to provide a mass air flow sensor (MAFS) that directly reads the mass air flow passing through the air intake passage of the engine. The mass air flow sensor can comprise a small thermal detector and heaters supported on a very small silicon bridge or, alternatively, can comprise a hot wire anemometer. Another method for determining the mass air flow into an engine uses a manifold absolute pressure (MAP) sensor in combination with a charge air temperature sensor.

Sensing mass air flow or manifold absolute pressure within the air intake manifold requires a certain degree of flow stability within the manifold. Rapid changes in pressure and flow rate within the intake passage of an engine cause severe problems if the sensors are intended to provide reliable steady state magnitudes of the monitored parameters. This is particularly exacerbated in engines which have small air intake passages with little volume. In other words, very short air intake manifolds typically do not contain enough volume to act as an accumulation to damp or smooth the rapidly changing pressures caused by the opening and closing of intake valves of the engine. As a result, the reliability of pressure measurements or air flow measurements provided by sensors within the air intake manifold is significantly decreased. It would therefore be significantly beneficial if a system could be provided for determining the air charge mass for an internal combustion engine without having to measure manifold absolute pressure or mass air flow within the air stream passing through the air intake manifold.

SUMMARY OF THE INVENTION

A method for determining the air charge mass for an internal combustion engine, in a preferred embodiment of the present invention, comprises the steps of measuring the barometric pressure proximate the engine, measuring the temperature of air proximate an air intake passage of the engine, and determining a position of a throttle of the engine. In addition, it comprises the step of calculating the air charge mass as a function of the barometric pressure, the temperature of air flowing into the air intake passage of the engine, and the position of the throttle of the engine.

The barometric pressure can be measured at any location reasonably proximate the engine since barometric pressure is a function of the environment and does not change rapidly. In addition, the temperature of the air proximate the air intake passage can be measured either within the air intake manifold or proximate the intake passage. The throttle position can be determined by a rotational position sensor or, when a stepper motor is used to position the throttle plate, from signals taken directly from the stepper motor or provided to the stepper motor as position commands.

The method of the present invention can further comprise a step of determining an actual exposed area of the throttle body passage as a function of the position of the throttle of the engine and determining a throttle effective area by adjusting the actual exposed area by a non-isentropic flow factor.

In a preferred embodiment of the present invention, the method can further comprise the step of determining the effective throttle area directly from the position of the throttle of the engine.

The present invention can further comprise the step of selecting a predetermined ratio of manifold pressure to barometric pressure as a dual function of an operating speed of the engine and a value which is calculated as a function of cylinder swept volume, number of cylinders, engine speed, the ideal gas constant, manifold air temperature, and throttle effective area.

BRIEF DESCRIPTION OF THE DRAWINGS

The present invention will be more fully and completely understood from a reading of the description of the preferred embodiment in conjunction with the drawings, in which:

FIG. 3 is a representative two dimensional array of variables used to store a plurality of ratios of manifold pressure to barometric pressure for a particular engine;

FIGS. 4 and 5 are two views of a throttle body and throttle plate of the engine;

FIG. 6 is a one dimensional array which stores a plurality of values for throttle effective area as a function of throttle position.

DESCRIPTION OF THE PREFERRED EMBODIMENT

Figure 1:
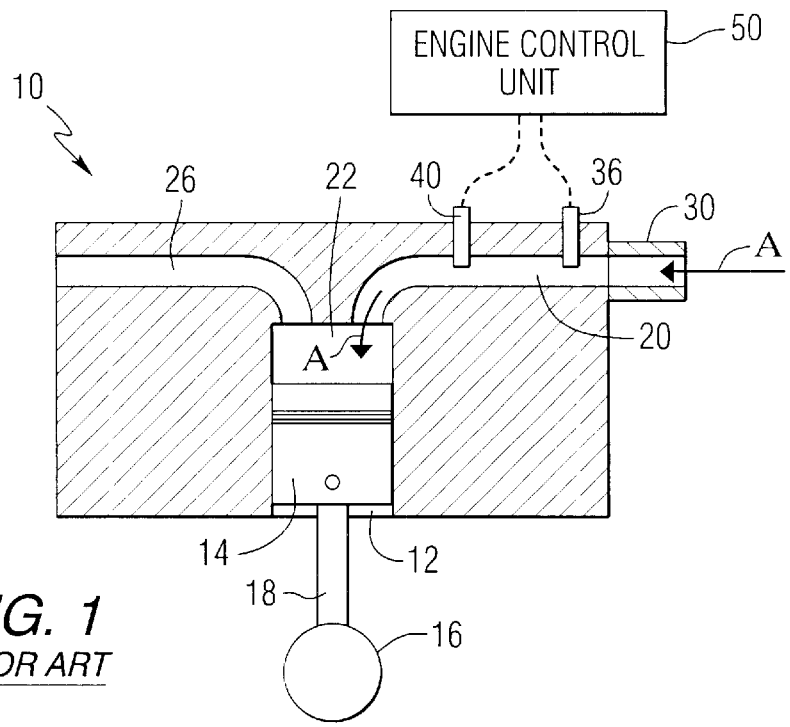
FIG. 1 shows a known system for determining the air charge mass of an engine.

Throughout the description of the preferred embodiment of the present invention, like components will be identified by like reference numerals. In addition, the present invention will be described in terms of the variables and symbols shown below in Table I.

TABLE I $A_e$ = throttle effective area
N = engine speed (RPM)
n = number of cylinder events per revolution of the engine
$m_a$ = air charge mass
$P_b$ = barometric pressure
$P_m$ = manifold pressure
R = ideal gas constant
$T_a$ = manifold air temperature
$V_{cyl}$ = cylinder swept volume
$\gamma$ = ratio of specific heats for air
$\eta_v$ = engine volumetric efficiency FIG. 1 is a simplified representation of an engine 10 with a cylinder 12 in which a piston 14 is disposed for reciprocal movement. The piston 14 is connected to a crankshaft 16 by a connecting rod 18. Air, represented by arrows A, flows into an intake manifold 20 which directs the air into a combustion chamber 22. It should be understood that no valves are illustrated in FIG. 1 for purposes of clarity and simplicity. Following a combustion event within the combustion chamber 22, the exhaust flows out through an exhaust passage 26. In FIG. 1, a throttle body 30 is schematically represented at the inlet of the intake passage. In order to determine the air charge mass within the combustion chamber 22 during any particular combustion event, the control system can utilize either of two possible methods which are both known to those skilled in the art. First, a mass air flow sensor (MAFS) 36 can be used to directly measure the mass air flow through air passage 20. This can be accomplished through the use of a mass air flow sensor or a hot wire anemometer. Unfortunately, this method can be deleteriously affected by rapid and severe fluctuations in intake pressure within the intake passage 20. In addition, the sensor 36 is often bulky and expensive. A second known method is referred to as the "speed-density system" of air charge mass estimation. This system requires the use of a manifold absolute pressure (MAP) sensor 40. Because the manifold absolute pressure sensor 40 must measure the pressure within air passage 20, it suffers from the same disadvantages as the mass air flow sensor 36 when significant fluctuations in intake pressure are possible.

If the air passage 20 or air intake manifold is relatively large in volume and the engine 10 has a significant number of cylinders 12, pressure fluctuations within the air intake passage 20 are sometimes damped by the accumulator effect of this larger volume and the two known systems described above can be used. However, in small engines with relatively low volume air intake passages 20, the pressure fluctuations can make the above two systems extremely difficult or impossible to implement. The engine control unit 50 which receives the signals from either the mass air flow sensor 36 or the manifold absolute pressure sensor 40 must rely on the accuracy of the measured magnitudes of the respective parameters. If these magnitudes are fluctuating rapidly and by significant magnitudes, the information provided by the sensors is not reliable. It should be understood that, although both a mass air flow sensor 36 and an manifold absolute pressure sensor 40 are shown together in FIG. 1, most systems would use one or the other and not necessarily both sensors in one application.

Figure 2:
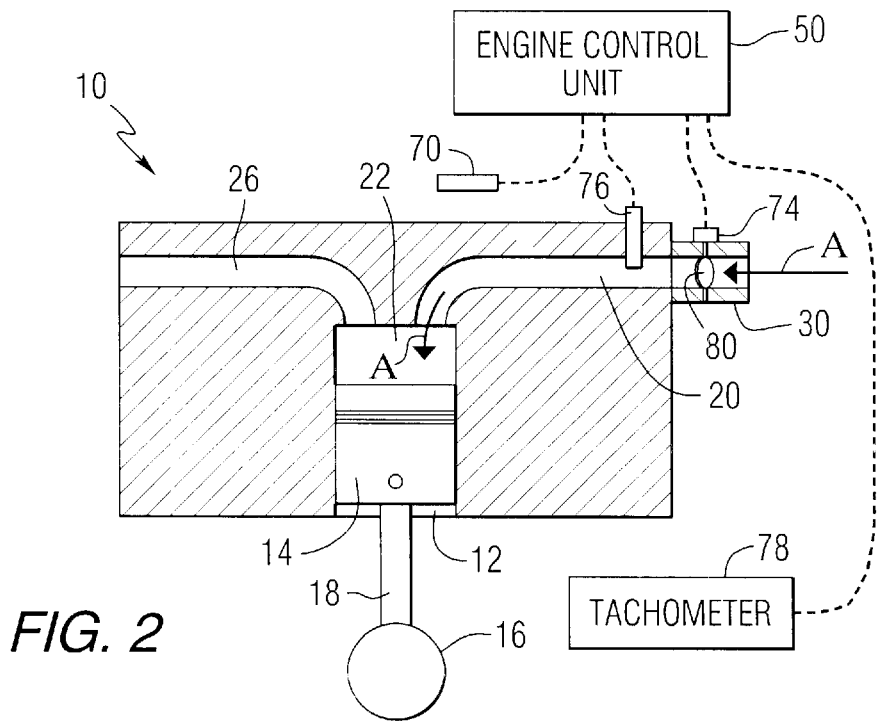
FIG. 2 illustrates a control system incorporating the principles of the present invention.

FIG. 2 shows an embodiment of the present invention. The engine control unit (ECU) 50 is provided with signal inputs from a barometric pressure sensor 70, a throttle position sensor 74, a charge air temperature sensor 76, and a tachometer 78 which measures engine speed. Although the charge air temperature sensor 76 is shown positioned to measure air temperature within the air intake passage 20, it should be understood that the charge air temperature can also be measured by placing the charge air temperature sensor 76 near the inlet of the throttle body 30. The throttle position sensor (TPS) 74 can be a rotational or angular position sensor which provides a signal to the engine control unit 50 representing the angular position of the throttle plate 80 within the throttle body 30. Alternatively, if a stepper motor is used to move the throttle plate 80, the engine control unit 50 can receive signals from the stepper motor or, alternatively, can use signals provided by the engine control unit 50 to the stepper motor when the stepper motor is commanded to move to a position selected by the engine control unit 50. Although no fuel injector is illustrated in FIG. 2, it should be understood that the present invention is also useable in conjunction with an engine 10 that incorporates fuel injection.

Equation 1, shown below, defines a mass air flow rate in terms of barometric pressure which is measured by the barometric pressure sensor 70, cylinder swept volume which is a functional characteristic of the engine, engine speed which is measured by the tachometer 78, engine volumetric efficiency, the number of cylinder events per revolution of the engine, the ideal gas constant, and the manifold air temperature which is measured by the manifold air temperature sensor 76.

With reference to Equation 1, the number of cylinder events per revolution of the engine is determined by the number of cylinders 12 of the engine 10. The cylinder swept volume is a physical characteristic of the engine 10 which is a function of the cylinder diameter and the piston stroke.

$$d(m_a)/dt = (P_b V_{cyl} N \eta_v n)/RT_a \quad (1)$$

Equation 1 is the equation typically used in systems that incorporate the "speed density system". Equation 2, shown below, also defines the mass air flow rate, but in terms of different variables than in Equation 1. Equation 2 is a compressible flow equation. It defines the mass air flow rate in terms of the throttle effective area, barometric pressure, a mathematical parameter Φ that will be described below in conjunction with FIG. 3, the ideal gas constant, and the manifold air temperature. The mathematical parameter Φ used in Equation 2 is calculated according to the relationships shown in Equation 3. It is calculated as a function of the ratio of specific heats for air and the ratio of manifold pressure to barometric pressure. The ratio of specific heats for air is the ratio between the specific heat for a constant volume for air and the specific heat for a constant pressure for air. It should be understood that Equation 2 could be expressed without use of the mathematical parameter Φ defined in Equation 3, but the use of the parameter defined in Equation 3 simplifies the expression and clarity of Equation 2.

$$d(m_a)/dt = (A_e P_b \Phi)/(RT_a)^{1/2} \quad (2)$$

$$\Phi = (2\gamma/(\gamma-1)) \; ((P_m/P_b)^{2/\gamma} - (P_m/P_b)^{(\gamma+1)/\gamma})^{1/2} \quad (3)$$

By combining Equations 1 and 2, Equation 4 can be expressed in terms of the ratio between the mathematical parameter defined in Equation 3 and the engine volumetric efficiency. For the time being, this ratio can be used without having to solve for the specific values of either the mathematical parameter defined by Equation 3 or the engine volumetric efficiency. The ratio described in Equation 4 is defined in terms of the cylinder swept volume which is a physical function of the engine, the engine speed which is measured by the tachometer 78, the number of cylinder events per revolution of the engine, the throttle effective area, the ideal gas constant, and the manifold air temperature which is provided by the manifold air temperature sensor 76 in FIG. 2.

$$\Phi/\theta_v = (V_{cyl} N n)/A_e (RT_a)^{1/2} \quad (4)$$

Although manifold air pressure (MAP) need not be measured according to the method of the present invention, the ratio between manifold air pressure and the barometric pressure, described in Equation 5, can be empirically determined as a characteristic of the engine during calibration procedures for the type of engine 10 using the present invention and the ratios between the manifold pressure and the barometric pressure can be stored in a table such as that illustrated in FIG. 3. It should be understood that the values stored in the table, shown in FIG. 3 are determined empirically during calibration of the engine 10 and need not be measured dynamically when the engine 10 is operated. The values in the table of FIG. 3 are determined and stored as a dual function of the ratio defined in FIG. 4 and the engine speed in RPM measured by the tachometer 78. This functional relationship is shown in Equation 5.

$$P_m/P_b = f(\Phi/\eta_v, RPM) \quad (5)$$

Once the ratio of manifold pressure to barometric pressure is obtained from the table in FIG. 3, the magnitude of the mathematical parameter Φ shown in Equation 3 can be solved. When Equation 3 is solved, all of the parameters shown to the right of the equal sign in Equation 6 are known. The throttle effective area is determined as a function of the actual exposed area in the throttle body 30 and a non-isentropic flow factor. The actual exposed area can be geometrically determined from the position of the throttle plate 80.

$$m_a = (A_e P_b \Phi)/(nN(RT_a)^{1/2}) \quad (6)$$

FIG. 4 is a side view of the throttle body 30, with throttle plate 80 being rotatable about a centerline of its shaft 90. Reference numeral 74 identifies a rotational position sensor such as the one described above in conjunction with FIG. 2. FIG. 5 is an end view of FIG. 4. The shaded area in FIG. 5 shows the actual exposed area 94 within the throttle body 30 with the throttle plate 80 at a particular position. The actual exposed area 94 can be calculated geometrically and adjusted by a factor representing the non-isentropic flow under various conditions. The result of this calculation is the throttle effective area used in Equations 2, 4, and 6. A simpler and faster method for determining the throttle effective area is to calibrate the throttle body 30 for the engine 10 and store selected values of the throttle effective area as a function of throttle position.

FIG. 6 shows a data storage array which represents a series of values for the throttle effective area calculated and stored as a function of throttle position which is measured by the throttle position sensor 74. A direct look-up table, such as that shown in FIG. 6, is a simpler and quicker way to determine the throttle effective area as a function of throttle position than the geometric and algebraic method described above in conjunction with FIGS. 4 and 5.

As can be seen in Equation 6, the air charge mass can be determined directly as a function of the throttle effective area which, in turn, is the function of throttle position, the barometric pressure which is measured by the barometric pressure sensor 70, the mathematical parameter Φ defined in Equation 3, the number of cylinder events per revolution of the engine which is a known characteristic of the engine 10, the engine speed which is measured by the tachometer 78, the ideal gas constant, and the manifold air temperature which is measured by the manifold air temperature sensor 76.

Figure 7:
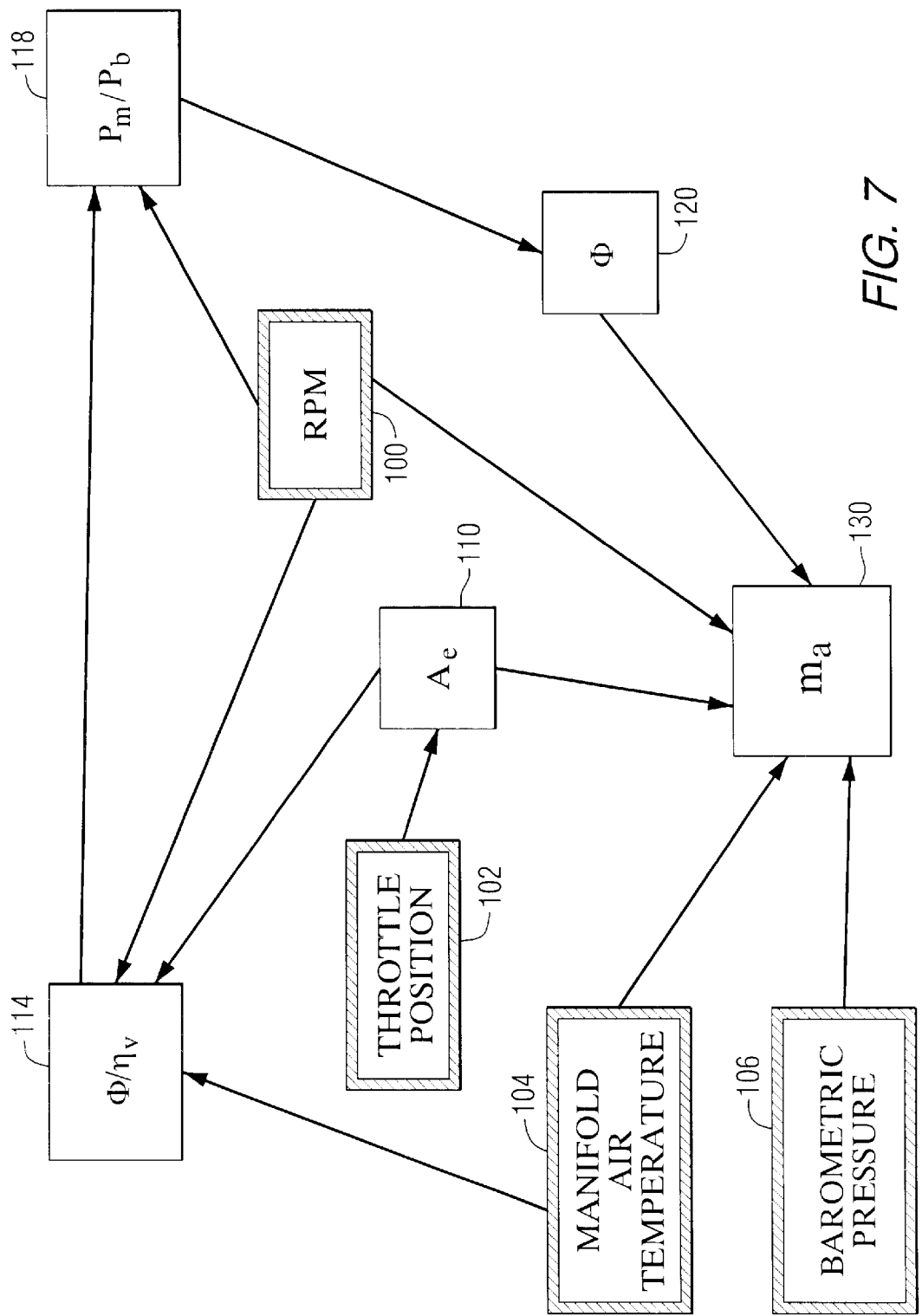
FIG. 7 is a schematic representation of the interrelationships of measured and calculated values used to determine air charge mass by the present invention.

FIG. 7 is a schematic representation of the interrelationships of the various parameters measured by the present invention or calculated from the measured parameters. In FIG. 7, the parameters which are directly measured by the present invention are shown with framed borders. These include the engine speed, or RPM 100, which is directly measured by the tachometer 78, the throttle position 102 which is measured by the throttle position sensor 74, the manifold air temperature 104 which is measured by the manifold air temperature sensor 76, and the barometric pressure 106 which is measured by the barometric pressure sensor 70. These sensors are shown in FIG. 2. Knowledge of the measured throttle position 102 allows the throttle effective area 110 to be determined either mathematically or by a look-up table. Knowledge of the manifold air temperature 104 and the engine speed 100, in combination with the throttle effective area 110, allows the value of a first parameter 114 to be determined as described above in conjunction with Equation 4. Knowledge of the magnitude of this first parameter 114, allows the ratio of manifold pressure to barometric pressure to be determined from the look-up table described above in conjunction with FIG. 3. This is represented by block 118 in FIG. 7. As a result of knowing the magnitude of the ratio of manifold pressure to barometric pressure at functional block 18, the value of a second parameter 120 can be determined from Equation 3. Since the barometric pressure 106, the manifold air temperature 104, the throttle effective area 110, the engine speed 100, and the value of the second parameter 120 are all known, the air charge mass 130 can be determined from Equation 6. From the above description of the present invention, it can be seen that the air charge mass can be determined without the requirements of either a mass air flow sensor in the air intake passage 20 or a manifold absolute pressure sensor within that same passage. This avoids the deleterious effect of rapidly fluctuating pressures within the air intake manifold. These fluctuations could significantly distort the monitored magnitudes of these variables and significantly decrease the reliability of the resulting calculation. The present invention only requires a barometric pressure sensor 70 which is not susceptible to rapidly changing magnitudes and a manifold air temperature sensor 76. As described above, it should be understood that the manifold air temperature sensor 76 could be located proximate the air intake port of the throttle body 30. However, even if the manifold air temperature sensor is placed within the air intake passage 20, the temperature being measured does not fluctuate nearly as rapidly as the air pressure within that passage. The information from the tachometer 78 provides engine speed values that are used in the manner described above in conjunction with Equations 1, 4, 5, and 6. The present invention provides a method in which the air charge mass can be accurately and quickly determined in a way that is not susceptible to the pressure fluctuations within the air intake manifold.

As described above, the method of the present invention comprises the steps of measuring the barometric pressure, the manifold air temperature, the engine speed, and the throttle position of the engine. The throttle effective area is calculated as a function of the position of the throttle and a non-isentropic flow factor. The value of a first parameter 114, as described in conjunction with Equation 4, is calculated as a function of cylinder swept volume, the number of cylinder events per revolution of the engine, the engine speed, the ideal gas constant, the temperature of manifold air, and the throttle effective area. A predetermined ratio 118 of manifold pressure to barometric pressure is selected, through the use of a table similar to the one shown in FIG. 3, as a dual function of both the value of the first parameter 114 defined by Equation 4 and the engine speed 100. A value of a second parameter 120, described above in conjunction with Equation 3, is then calculated as a function of the ratio of manifold pressure to barometric pressure and also as a function as a ratio of the constant volume specific heat for air to the constant pressure specific heat for air. The charge air mass 130 is then calculated as a function of the throttle effective area 110, the barometric pressure 106, the value of the second parameter 120, the ideal gas constant, the temperature of manifold air 104, the number of cylinder events per revolution of the engine, and the engine speed.

Although the present invention has been described in particular detail and illustrated to show a particularly preferred embodiment, it should be understood that alternative embodiments are also within its scope.

We claim:

1. A method for determining the air charge mass for an internal combustion engine, comprising the steps of:

measuring barometric pressure proximate said engine;

measuring a temperature of air proximate an air intake passage of said engine;

determining a position of a throttle of said engine;

determining an actual exposed area of a throttle body passage as a function of said position of said throttle of said engine;

determining a throttle effective area by adjusting said actual exposed area by a non-isentropic flow factor;

measuring a speed of said engine; and selecting a predetermined ratio of manifold pressure to barometric pressure as a dual function of said operating speed of said engine and a value which is calculated as a function of cylinder swept volume, number of cylinders, said operating speed of said engine, the ideal gas constant, manifold air temperature, and throttle effective area; and calculating said air charge mass as a function of said barometric pressure, said temperature of air flowing into said air intake passage of said engine, and said position of said throttle of said engine.

2. The method of claim 1, further comprising:

determining an effective throttle area directly from said position of said throttle of said engine.

3. A method for determining the air charge mass for an internal combustion engine, comprising the steps of:

measuring barometric pressure proximate said engine;

measuring a temperature of manifold air of an air intake passage of said engine;

measuring an engine speed of said engine;

determining a throttle position of a throttle of said engine;

calculating a throttle effective area as a function of said position of said throttle and a non-isentropic flow factor; and calculating a value of a first parameter as a function of cylinder swept volume, the number of cylinder events per revolution of said engine, said engine speed, an ideal gas constant, said temperature of manifold air, and said throttle effective area;

selecting a predetermined ratio of manifold pressure to barometric pressure as a dual function of both said value of said first parameter and said engine speed;

calculating a value of a second parameter as a function of said ratio of manifold pressure to barometric pressure and a ratio of the constant volume specific heat for air to the constant pressure specific heat for air; and calculating said charge air mass as a function of said throttle effective area, said barometric pressure, said value of said second parameter, said ideal constant, said temperature of manifold air, said number of cylinder events per revolution of said engine, and said engine speed, wherein said step for calculating said value of said first parameter uses the relationship $$\Phi/\eta_v = (V_{cyl} Nn)/A_e (RT_a)^{1/2}$$

where $\Phi/\eta_v$ is said first parameter, $V_{Cyl}$ is said cylinder swept volume, N is said engine speed, n is the number of cylinder events per revolution of said engine, R is said ideal gas constant, $A_e$ is the throttle effective area, and $T_a$ is the manifold air temperature.

4. The method of claim 3, wherein:

said step for calculating said value of a second parameter uses the relationship $$\Phi = (2\gamma/(\gamma-1))((P_m/P_b)^{2/\gamma} - (P_m/P_b)^{(\gamma+1)/\gamma})^{1/2}$$

where $\Phi$ is said second parameter, $\gamma$ is the ratio of the constant volume specific heat for air to the constant pressure specific heat for air, and $P_m/P_b$ is said ratio of said manifold pressure to said barometric pressure.

5. The method of claim 3, wherein:

said step for calculating said charge air mass uses the relationship $$m_a = (A_e P_b \Phi)/(nN(RT_a)^{1/2})$$

where $m_a$ is said charge air mass and $P_b$ is said barometric pressure.

6. The method of claim 3, wherein:

said step of selecting a predetermined ratio of manifold pressure to barometric pressure as a dual function of both said value of said first parameter and said engine speed comprises the step of storing a plurality of said predetermined ratios in a table in a memory device and subsequently selecting said predetermined ratio of manifold pressure to barometric pressure as a function of recently measured magnitude of engine speed.

7. A method for determining the air charge mass for an internal combustion engine, comprising the steps of:

measuring barometric pressure proximate said engine;

measuring a temperature of manifold air of an air intake passage of said engine;

measuring an engine speed of said engine;

determining a throttle position of a throttle of said engine;

calculating a throttle effective area as a function of said position of said throttle and a non-isentropic flow factor; and calculating a value of a first parameter as a function of cylinder swept volume, the number of cylinder events per revolution of said engine, said engine speed, an ideal gas constant, said temperature of manifold air, and said throttle effective area;

selecting a predetermined ratio of manifold pressure to barometric pressure as a dual function of both said value of said first parameter and said engine speed;

calculating a value of a second parameter as a function of said ratio of manifold pressure to barometric pressure and a ratio of the constant volume specific heat for air to the constant pressure specific heat for air; and calculating said charge air mass as a function of said throttle effective area, said barometric pressure, said value of said second parameter, said ideal constant, said temperature of manifold air, said number of cylinder events per revolution of said engine, and said engine speed, wherein said step for calculating said value of a second parameter uses the relationship $$\Phi = (2\gamma/(\gamma-1))((P_m/P_b)^{2/\gamma} - (P_m/P_b)^{(\gamma+1)/\gamma})^{1/2}$$

where $\Phi$ is said second parameter, $\gamma$ is the ratio of the constant volume specific heat for air to the constant pressure specific heat for air, and $P_m/P_b$ is said ratio of said manifold pressure to said barometric pressure.

8. The method of claim 7, wherein:

said step for calculating said value of said first parameter uses the relationship $$\Phi/\eta_v = (V_{cyl} N n)/A_e (RT_a)^{1/2}$$

where $\Phi/\eta_v$ is said first parameter, $V_{cyl}$ is said cylinder swept volume, N is said engine speed, n is the number of cylinder events per revolution of said engine, R is said ideal gas constant, $A_e$ is the throttle effective area, and $T_a$ is the manifold air temperature.

9. The method of claim 7, wherein:

said step for calculating said charge air mass uses the relationship $$m_a = (A_e P_b \Phi)/(nN(RT_a)^{1/2})$$

where $m_a$ is said charge air mass and $P_b$ is said barometric pressure.

10. The method of claim 9, wherein:

said step of selecting a predetermined ratio of manifold pressure to barometric pressure as a dual function of both said value of said first parameter and said engine speed comprises the step of storing a plurality of said predetermined ratios in a table in a memory device and subsequently selecting said predetermined ratio of manifold pressure to barometric pressure as a function of recently measured magnitude of engine speed.

* * * * *